United States Patent [19]
Tegland et al.

[11] 3,867,713
[45] Feb. 18, 1975

[54] MULTIFOLD SEISMIC EXPLORATION OVER PURPOSEFULLY CROOKED TRAVERSES

[75] Inventors: Edward R. Tegland, Dallas, Tex.; Howard L. Viger, Metairie, La.

[73] Assignee: Texas Instruments Incorporated, Dallas, Tex.

[22] Filed: June 22, 1973

[21] Appl. No.: 372,712

[52] U.S. Cl.... 340/15.5 CP, 340/7 R, 340/15.5 MC
[51] Int. Cl. ....... G01v 1/13, G01v 1/20, G01v 1/38
[58] Field of Search...... 340/15.5 CP, 15.5 MC, 7 R

[56] References Cited
UNITED STATES PATENTS

| | | | |
|---|---|---|---|
| 3,597,727 | 8/1971 | Judson et al. | 340/15.5 CP |
| 3,731,270 | 5/1973 | Penhollow | 340/15.5 CP |
| 3,806,863 | 4/1974 | Tilley et al. | 340/15.5 MC |

Primary Examiner—Malcolm F. Hubler
Assistant Examiner—H. A. Birmiel
Attorney, Agent, or Firm—Harold Levine; Rene' Grossman; Leo N. Heiting

[57] ABSTRACT

In seismic exploration, seismic impulses are generated successively at locations uniformly spaced along traverse segments which regularly cross a median line. The segments are of length equal to an integral multiple of the spacing between the locations. Seismic waves resulting from each impulse are detected at a set of the locations which bears the same traverse relationship to its shot point where the impulse giving rise to the detected waves is generated as every other set bears to its shot point. Preferably, the detected signals are stacked on a common depth point basis to portray regularly patterned multifold areal subsurface structure.

8 Claims, 8 Drawing Figures

FIG. 4

MULTIFOLD SEISMIC EXPLORATION OVER PURPOSEFULLY CROOKED TRAVERSES

This invention relates to seismic exploration, and more particularly to acquisition and utilization of seismic signals produced on a purposefully crooked seismic traverse in order to portray subsurface seismic structure on an areal basis.

In geophysical prospecting, it is common practice to use an array of seismometers to detect the seismic disturbances from an explosion detonated at or below the surface of the earth. Seismometer output signals have been summed to produce a composite trace for enhancing the subsurface structure information represented by features of such signals. The purpose is to give prominence to the important features in the received seismic signal and to reduce or remove those features which obscure the important parts of the signal. Both direct and weighted summations of seismometer array outputs have been used. Of particular importance in signal-to-noise enhancement are record stacking techniques generally carried out in accordance with the method and system disclosed in U.S. Pat. No. 2,732,906 which issued to Mayne. The latter technique is generally known in the art as common depth point stacking.

The present invention is directed to common depth point stacking. Common depth point stacking techniques have been further enhanced by various improvements. For example, in U.S. Pat. No. 3,539,984 to Schneider entitled "Optimum Horizontal Stacking," common depth point procedures were employed with improved results.

The present invention is directed to enhancing the yield of information available from seismic operations involving common depth point stacking techniques. The method and system of this invention are directed to combine the effect of a common depth point stack and an areal seismometer array.

More particularly, in accordance with the present invention, a method of gathering seismic information involves generating seismic impulses successively, one impulse at each of a plurality of shot point locations uniformly spaced along traverse segments which regularly cross a median line wherein the segments are of length equal to an integral multiple of the spacing between the locations. The seismic waves resulting from each such impulse are detected at a set of the locations, which set bears the same traverse relationship to its shot point when the impulse giving rise to the detected waves is generated as every other set bears to its shot point. The detected signals may then be stacked on a common depth point basis to portray a multifold areal subsurface structural condition on a regular subsurface pattern basis.

For a more complete understanding of the invention reference may now be had to the following description taken in conjunction with the accompanying drawings in which:

FIG. 4 illustrates a subsurface reflecting point involved when a crooked surface traverse is employed with six detector groups per side;

Figure 1:
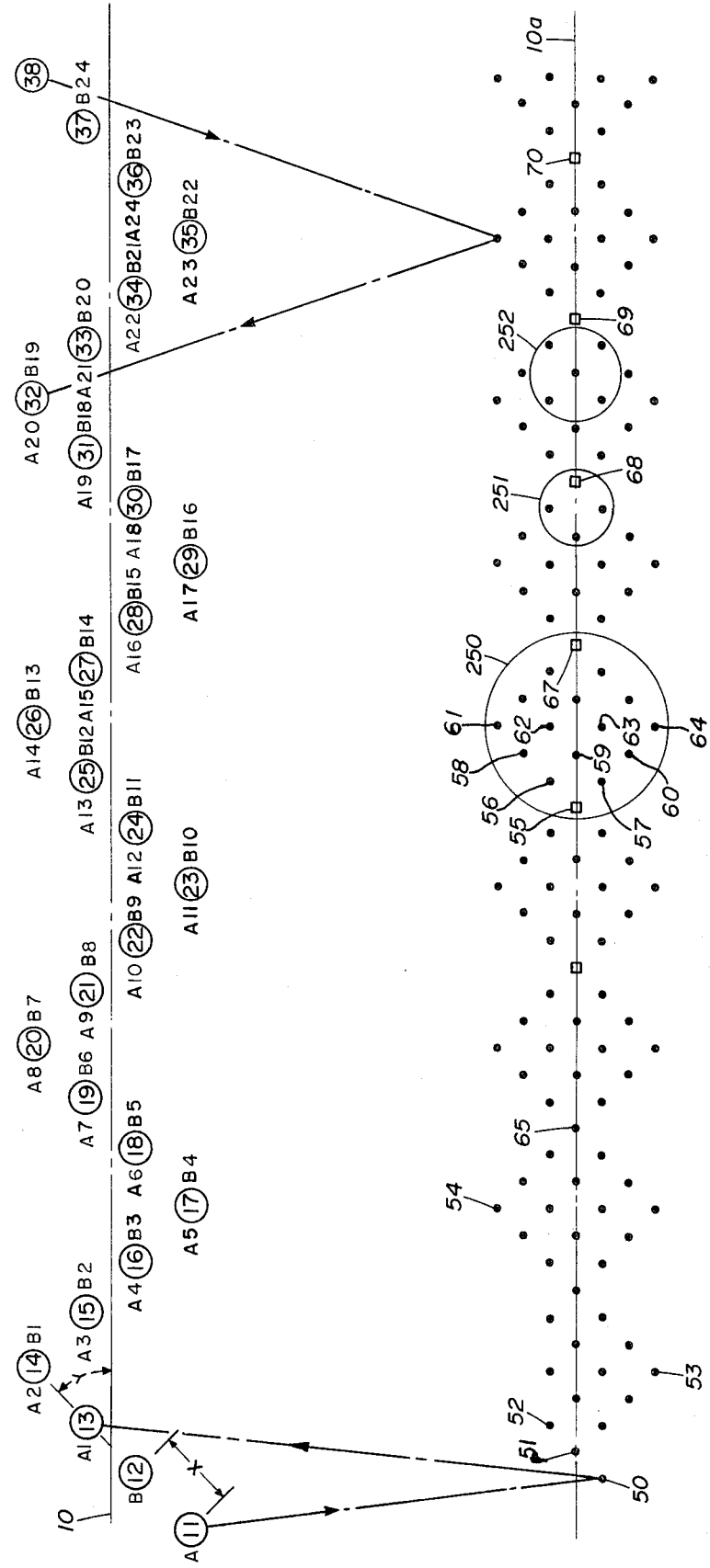
FIG. 1 is a plot of a crooked surface traverse together with a plot of related common subsurface reflecting points.

A representative and preferred method of carrying out field procedures in the present invention is illustrated in FIG. 1 wherein line 10 is the center line or median of a seismic traverse. For the purpose of the following description, it will be understood that the seismic field operation proceeds on a continuous basis along the traverse of line 10 with shot points located at stations 11–38. At each of the shot points, a seismic impulse will be generated. The resultant seismic waves will then be detected by a spread of detector groups located at selected sets of the same stations. For example, for a shot point A at station 11, the spread of 24 seismic detector groups A1-A24 will be located at stations 13–36. A 24 trace seismogram will thus be produced by detecting the seismic waves produced at shot point A, station 11. Thereafter, the system will be moved forward one station. More particularly, for shot point B, location 12, the 24 detector group spread B1-B24 will be from station 14 through 37. A 24 trace seismogram will then be produced by the generation of a seismic impulse at shot point B, station 12. Next, a seismic impulse will be generated at shot point C, station 13 with detector groups C1-C24 located at stations 15–38. By continuing such a field procedure, continuous multiple coverage of the subsurface is achieved.

Preferably in accordance with the invention, the seismic signals from each detector group will be recorded in digital phonographically reproducible form for ease in automatic processing thereof in stacking operations.

In accordance with the present invention, it will be noted that the locations 11–38, forming the predetermined location along that portion of traverse 10 illustrated in FIG. 1, are laid out on a sawtooth pattern symmetrical to median 10. Locations 11–38 thus represent a sawtooth pattern of locations at which seismic waves will be generated and at which seismic waves will be detected by detector groups.

Each seismic impulse may be generated in the conventional manner as by the detonation of an explosive charge in a shot hole penetrating the surface layers of the earth or by operation of conventional weight dropping systems.

Location 11 is above referred to as shot point A. Location 12 is referred to as shot point B. Location 13 is the site of a detector group A1. Location 14 is the site of a detector group A2 as well as group B1. Location 15 is the site of groups A3 and B2. Locations 11–38 are spaced apart uniform distances, spacings of 220 ft., 330 ft., 440 ft. having been found suitable. The length of each sawtooth segment of the traverse is an integral multiple of the geophone spacing X. Preferably the angle Y will be 45°. Larger or smaller values for angle Y may be used but with some deterioration of the regularity of the resulting subsurface information.

Figure 2:
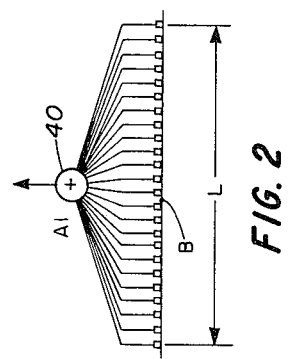
FIG. 2 illustrates a preferred form of unit detector group to be located at the detector stations of FIG. 1.

FIG. 2 illustrates a typical detector group as located at point 13. This group A1 comprises 24 detectors positioned along a straight line on the earth's surface preferably parallel to median 10. Location 13 is at the center of the group. The group length L may be of the order of 220 ft. Signals from all of the detectors in the group of FIG. 2 are electrically summed in a unit 40. The output of summing unit 40 is then separately recorded in reproducible form for stacking with other signals produced by similar detector groups at other stations in spread A.

The procedure generally indicated in FIG. 1, therefore, is to locate detector groups A1-A24 at point locations 13-36, respectively. A seismic impulse is then generated at shot point A, location 11. The seismic waves thus generated travel over paths leading to subsurface reflecting horizons and back to the surface where they are detected by the geophone groups. Reflected seismic waves cause the geophone groups to generate electrical signals on a time scale representative of time occurrence, amplitude and frequency character of the reflected energy. The output signals, preferably digitized, are stored on magnetic media for stacking.

After completion of the operations involving the generation of the seismic impulse at shot point A, location 11, detector groups B1-B24 are arranged at locations 14-37. Thereafter, seismic energy generated at shot point B, location 12, is detected in spread B1-B24. Thereafter, the seismic detector groups C1-C24 (not labeled) are established at locations 15-38. Seismic energy is then generated at location 13. The field procedure then continues in accordance with the foregoing pattern with seismic impulses successively generated at locations 14-38 with the detecting spread being moved ahead of the shot points. In this example, two group distances space the shot point from the nearest detector group.

Also shown in FIG. 1 as centered along a subsurface median line 10a are common depth reflection points for all of the shot points and detector groups illustrated in FIG. 1. For example, seismic waves generated at shot point A and detected by detector group A1, location 13, will have been reflected from point 50. Seismic waves from shot point A detected by group A2, location 14, will have been reflected from a subsurface point 51. Energy generated at shot point B, location 12, and detected by group B1 at location 14 will have been reflected from point 52. Depth points 50, 51 and 52 are not common, but are singularly related to shot points A and B and detector groups A1, A2 and B1, simply because the operation is initiated at shot point A. However, if paths of travel of energy from locations 11 and 12 are considered, it will be understood that energy from location 11 detected by group A5, location 17, will have the reflection point 53. Energy from location 14 detected at location 20 would have a subsurface reflection point 54. Extension of such analysis will reveal that subsurface location 55 is a common depth point for a total of twelve traces produced by moving along traverse 10 as above explained. Depth points 56 and 57 are common depth points for six traces. Depth points 58, 59 and 60 are common depth points for four traces each, points 61 and 64 are common depth points for two traces each, and points 62 and 63 are common depth points for four traces each.

Depth point 65 on the other hand would be the common depth point for seven traces. However, after the initial taper due to starting the operations at shot point A has been completed, the twelvefold common depth point 55 and each of the successive center points 67, 68, 69 and 70 will be common depth points for twelve traces. The pattern which exists between the twelve fold points 55 and 67 is repeated between points 67 and 68, 68 and 69, 69 and 70, etc.

It will be apparent from the geometrical distribution of the common depth points which are arrayed symmetrically along the subsurface median 10a that a purposefully crooked seismic traverse on the surface along median 10 provides common depth point information on an areal basis which basis is a regular pattern. Regularity is an important factor in considering the ultimate use to which the data is to be placed, namely the interpretation of the subsurface layering of the earth on an areal basis since contour of subsurface layering either in terms of time or depth ultimately is desired.

Figure 3:
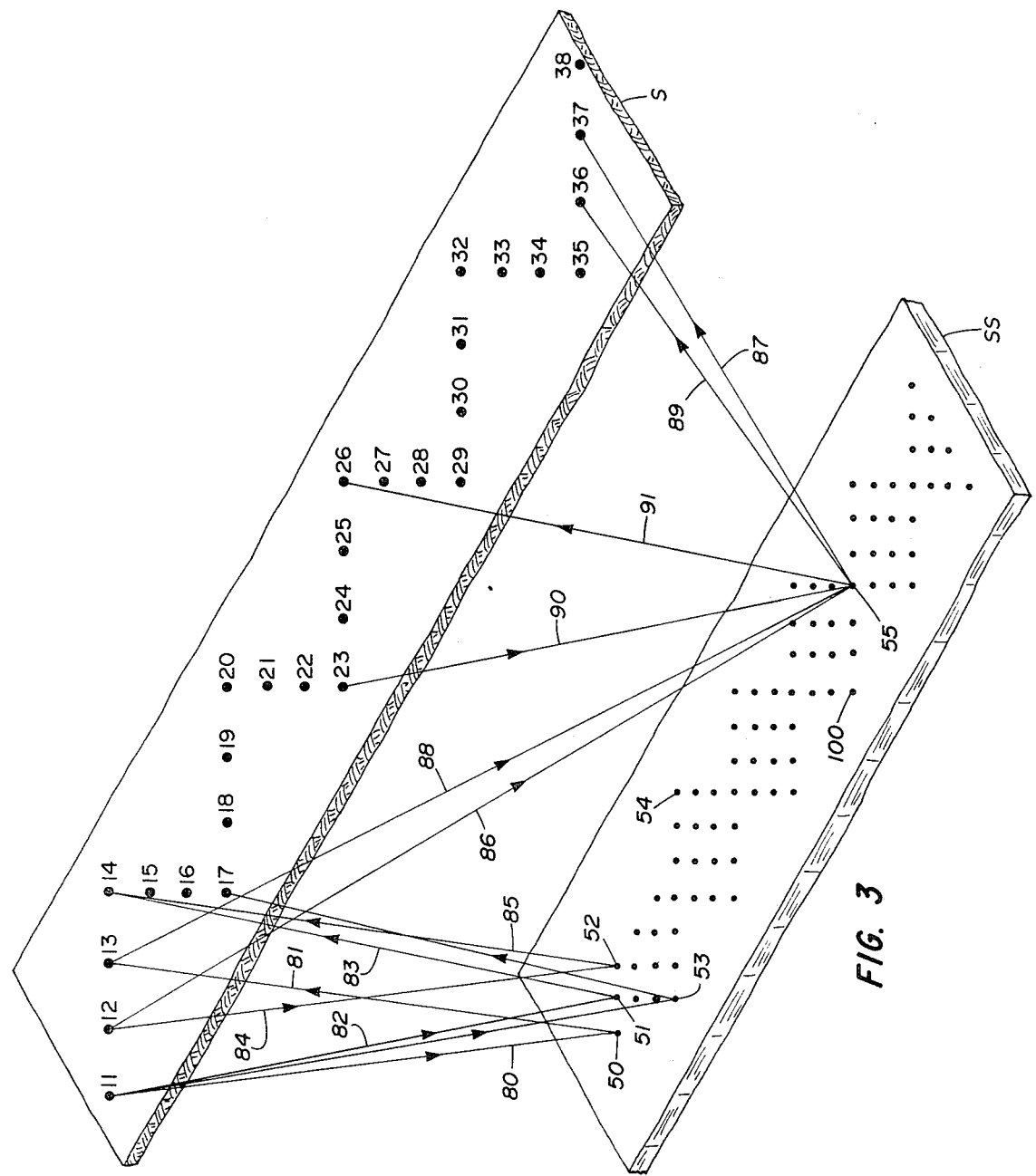
FIG. 3 is an isometric view showing certain of the ray paths involved in operating along the traverse of FIG. 1.

Referring now to FIG. 3, a surface layer S and a subsurface reflecting layer SS have been shown with the locations 11-13 plotted in isometric form and with the subsurface reflection points 50-55 being identified. It will be noted that incident ray 80 from station 11 reflected at point 50 as ray 81 is detected at station 13. Incident ray 82 from station 11 reflected at station 51 is detected as reflected ray 83 at station 14. Incident ray 84 reflected at point 52 as reflected ray 85 is detected at station 14. Thus, stations 50-53 relate only to one trace each.

In contrast, note that incident ray 86 reflected from point 55 as reflected ray 87 is detected at station 37. Incident ray 88 reflected as ray 89, also from point 55, is detected at station 36. Further, incident ray 90, also reflected from point 55 as ray 91, is detected at station 26. Similarly, incident rays from stations 14-22 will be detected at stations 35, 34, 33, 32, 31, 30, 29, 28 and 27, respectively, all from the common depth point 55 to give 12 fold coverage for depth point 55. The twelve seismic traces thus produced, common to subsurface point 55, will then be corrected for a normal moveout and summed in the manner basically described in Mayne U.S. Pat. No. 2,732,906 to provide a high signal-to-noise ratio common depth point trace.

By a similar study of FIG. 3, it will be noted that for depth point 100 an incident ray from station 11 will be reflected to station 35 and incident rays from station 17 will be reflected to station 29 to provide two fold coverage for point 100.

Figure 4:
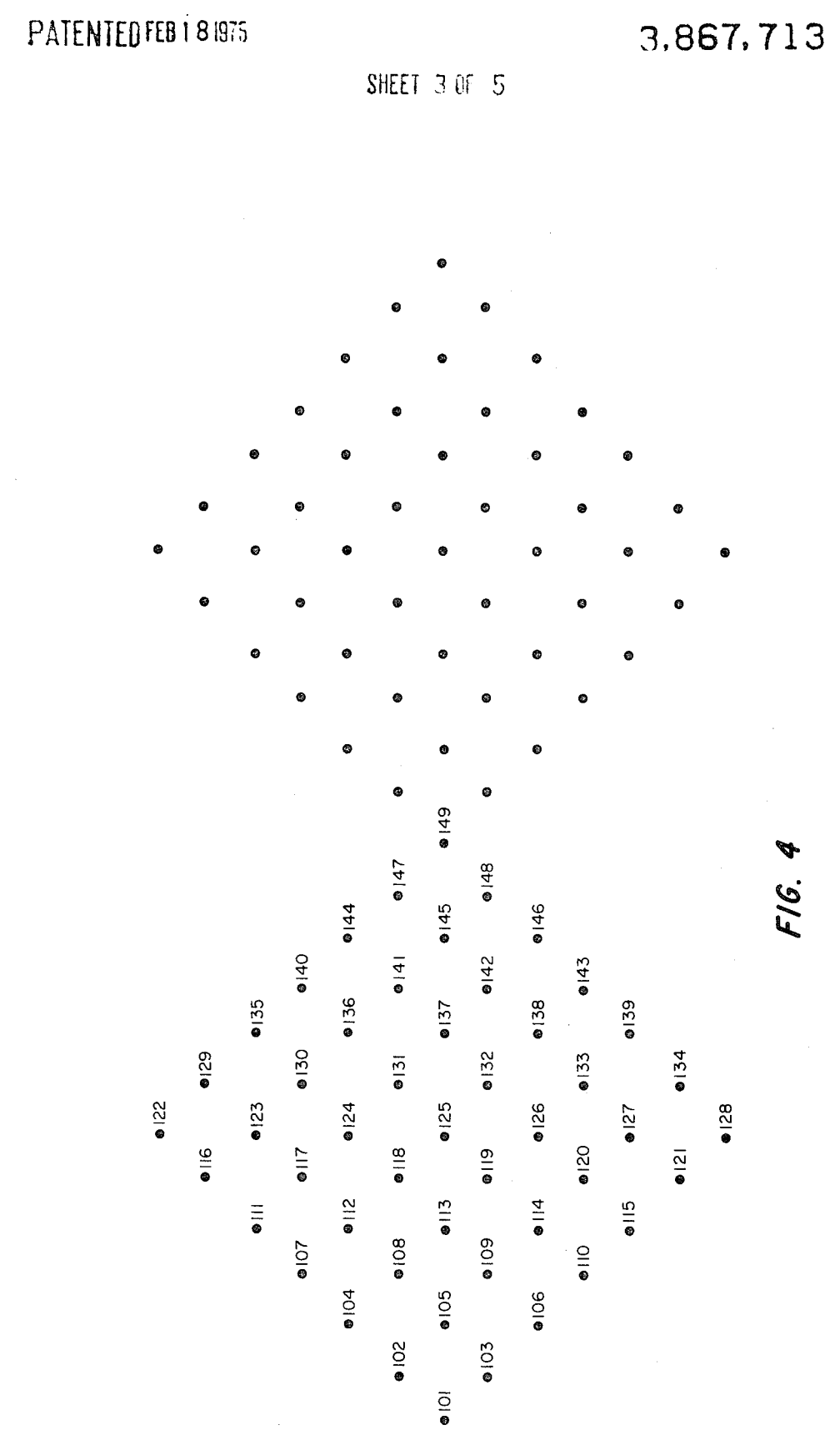

Referring now to FIG. 4, a subsurface pattern is illustrated where the surface traverse has six geophone spacings per side. This is in contrast with FIGS. 1 and 3 where the pattern has three spacings per side. With such a surface array, the subsurface set of reflection points for each pattern, 49 in number, are identified as points 101-149. In Table I there is listed for each of the 49 points in the array of FIG. 4 the prime trace number that will be employed for stacking to give multiple coverage for each of the points. Prime trace number as here used refers to the trace number given with relation to the position of the detector location in a spread. Normally all spreads used in accordance with FIG. 1 along a traverse will have the same spread relation to its shot point as every other spread has to its shot point.

In FIG. 1 the prime trace number for the signal produced by a detector group at location 13 for shot point A would be 1 and for the signal produced at location 36 would be 24.

TABLE I

| Station No. | Prime Trace No. |
|---|---|
| 101 | 23,21,19,17,15,13,11,9,7,5,3,1 |
| 102 | 16,12,10,8,6 |
| 103 | 24,22,20,18,4,2 |
| 104 | 15,13,11,9,7 |
| 105 | 17,5 |
| 106 | 23,21,19,3,1 |
| 107 | 14,12,10,8 |
| 108 | 16,6 |
| 109 | 18,4 |
| 110 | 24,22,20,2 |
| 111 | 13,11,9 |
| 112 | 15,7 |
| 113 | 17,5 |
| 114 | 19,3 |
| 115 | 23,21,1 |
| 116 | 12,10 |
| 117 | 14,8 |
| 118 | 16,6 |
| 119 | 18,4 |
| 120 | 20,2 |
| 121 | 24,22 |
| 122 | 11 |
| 123 | 13,9 |
| 124 | 15,7 |
| 125 | 17,5 |
| 126 | 19,3 |
| 127 | 21,1 |
| 128 | 23 |
| 129 | 12,10 |
| 130 | 14,8 |
| 131 | 16,6 |
| 132 | 18,4 |
| 133 | 20,2 |
| 134 | 24,22 |
| 135 | 13,11,9 |
| 136 | 15,7 |
| 137 | 17,5 |
| 138 | 19,3 |
| 139 | 23,21,1 |
| 140 | 14,12,10,8 |
| 141 | 16,6 |
| 142 | 18,4 |
| 143 | 24,22,20,2 |
| 144 | 15,13,11,9,7 |
| 145 | 17,5 |
| 146 | 23,21,19,3,1 |
| 147 | 16,12,10,8,6 |
| 148 | 24,22,20,18,4,2 |
| 149 | 23,21,19,17,15,13,11,9,7,5,3,1 |

Figure 5:
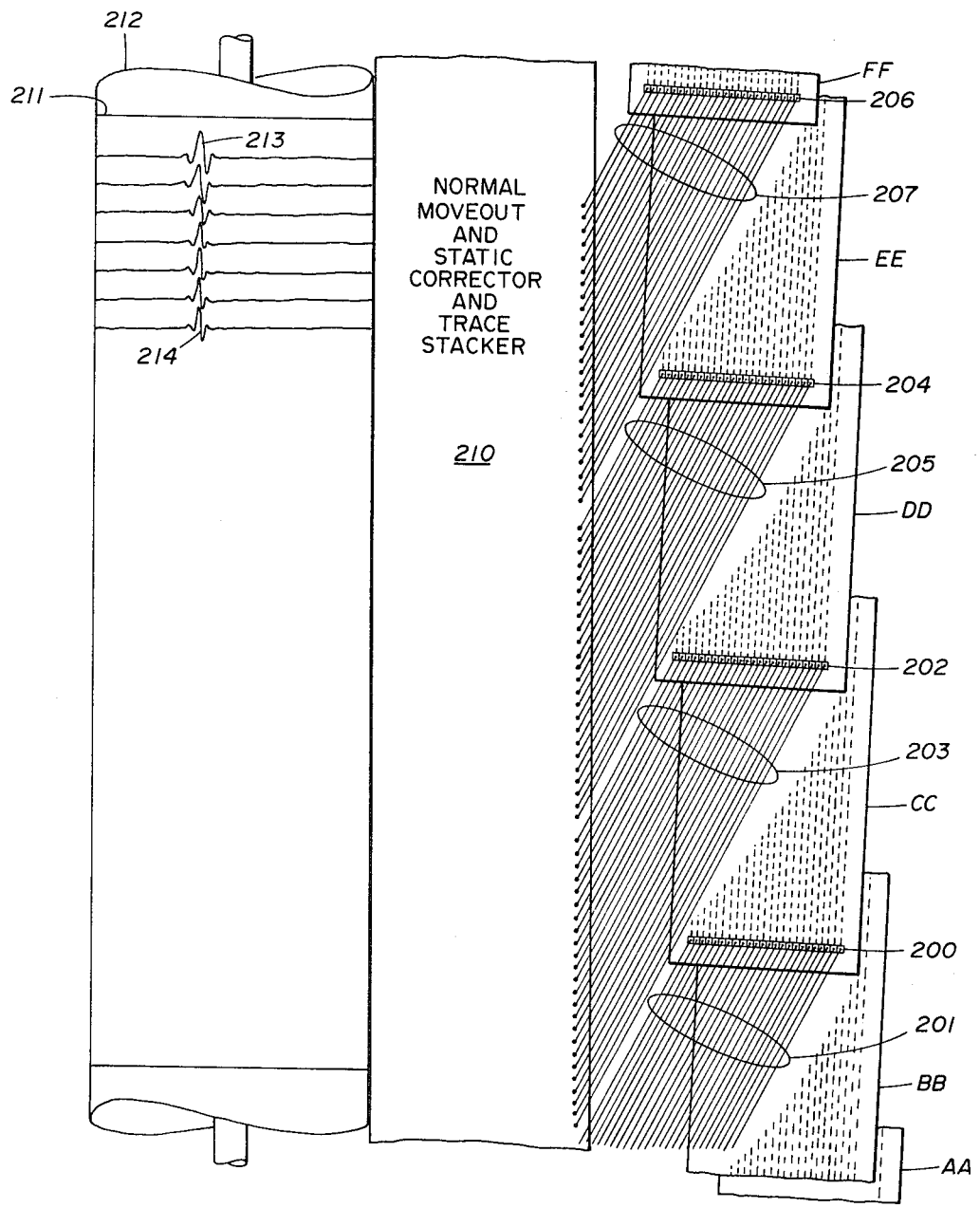
FIG. 5 illustrates the stacking of signals employed in the system of FIGS. 1–3.

Referring now to FIG. 5, records AA-FF are shown only in part. Record AA is the record produced by generating seismic energy at point A, station 11, FIG. 1, and detecting the resultant seismic waves in spread A1-A24. Similarly, records BB, CC, DD, EE and FF are records produced by successively generating energy at stations 13, 14, 15 and 16, respectively, and detecting the resultant energy at relocated spreads B1-B24, C1-C24 . . . F1-F24 of detector groups.

FIG. 5 indicates generally a conventional stacking system wherein the records such as record CC preferably comprising 24 traces of digitized magnetically recorded data moves past a set of reproducing heads 200 to produce on lines 201 a set of signals representing the data recorded on record CC. Similarly, reproducing heads 202 produce on lines 203 signals representative of the data on record DD. Playback heads 204 produce on lines 205 signals representative of record EE and playback heads 206 produce on lines 207 signals representative of data on record FF. The lines 201, 203, 205, 207 and likewise from the other records in the spread are connected to a normal moveout and trace stacker unit 210. In unit 210, the traces are corrected for normal moveout and are stacked in the manner dictated by the crooked spread above described and generally in accordance with the procedures disclosed in Mayne U.S. Pat. No. 2,732,906.

Thus, there may be produced an output which may be in the form of wiggly trace record section, or of variable area, variable density or combinations thereof to portray the subsurface structural character of the area covered by the common depth reflecting points. A record sheet 211 may be placed on a recording drum 212 to receive the output signals, resulting in a multifold composite of the traces from the various seismograms.

Traditionally, if the plane of the subsurface layer of FIG. 3 is horizontal and if static corrections as well as dynamic corrections have properly been made in unit 210, as are conventionally and continually performed in present day common depth point stacking operations, the signals representing reflected energy reflected from the subsurface spread such as signals 213–214 will be aligned in time across the record on medium 211 or will reflect any slope in the reflecting surface.

While the foregoing description has related primarily to a particular form of system, i.e., a system involving a sawtooth surface geometry for a spread layout symmetrical to a median line and with a particular set of detector arrays, it is to be understood that variations may be made. The foregoing description is representative of an embodiment of the invention which has been found to be suitable. A normal stacking technique in unit 210 may produce cross track arrays varying from one to four areal elements spaced on output as a function of the spacing between the detector group and the angle Y with a maximum of twelve fold per trace. A major composite of all of the traces having common depth points within the group 250, FIG. 1, may be combined to produce an 84 fold pattern from sixteen areal elements. A four element minor composite which yields alternate 28 and 16 fold stacks would be produced by utilizing groups such as the four elements in the outline 251. A five element minor composite yielding 24 and 36 fold data would be produced by employing the common depth point traces in outline 252. The stacked traces are characterized by the fact that they are corrected to vertical travel paths. Because of this, they may be simply summed in group 250, or 251 or 252 to provide an effectively larger trace spacing. When there exists significant dip in the subsurface beds, then a migration and summing method as shown in Rockwell U.S. Pat. No. 3,353,151 would be employed. Thus, there are a number of possibilities for data enhancement with minimum surface exploration costs by conducting the field work on the basis of a purposefully crooked traverse.

Figure 6:
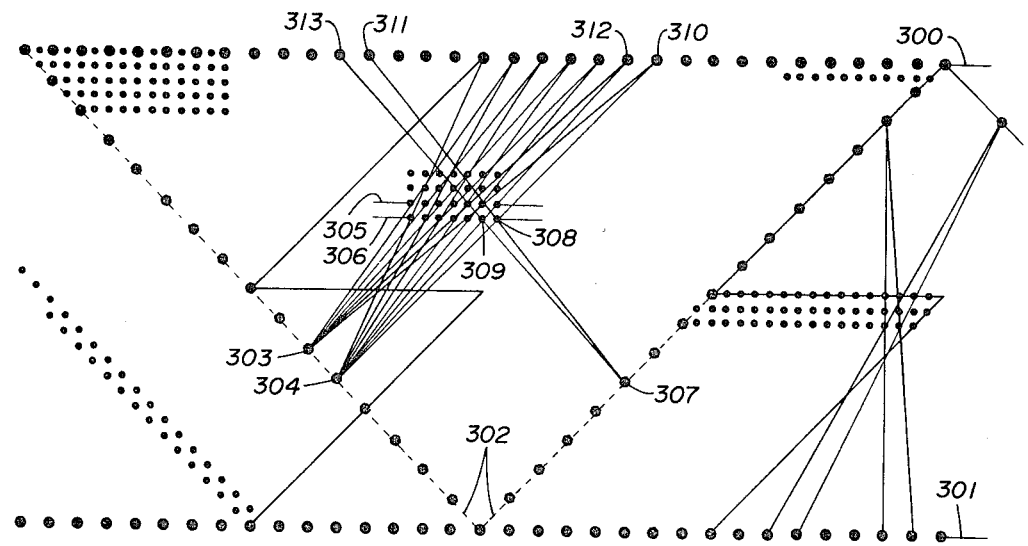
FIG. 6 illustrates a modified spread pattern for carrying out exploration on a purposefully crooked traverse.

In FIG. 6, a modified field pattern is illustrated. In this system a set of detector groups is arrayed along a line 300 with uniform group spacings. A second set of receiver locations is arrayed along a line 301. Source points are located successively along a crooked traverse such as along lines 302, forming a sawtooth pattern. Lines 302 will be part of a pattern extended in the course of a given exploration program between extensions of lines 300 and 301.

Areal subsurface coverage can be seen by referring to the travel paths of energy from source points 303 and 304. Reflecting points for energy produced at source point 303 would lie along line 305. Reflecting point for energy produced at source point 304 would lie along a line 306. Energy from source point 307 would be reflected at points 308 and 309. Seismic energy generated at source point 304 and detected at location 310 would be combined with energy generated at source point 307 and detected at location 311. Seismic energy generated at source point 304 and detected at location 312 would be stacked with energy generated at point 307 and detected at location 313. From the geometry of the system single coverage traces may be selected for stacking on a common depth point basis.

Figure 7:
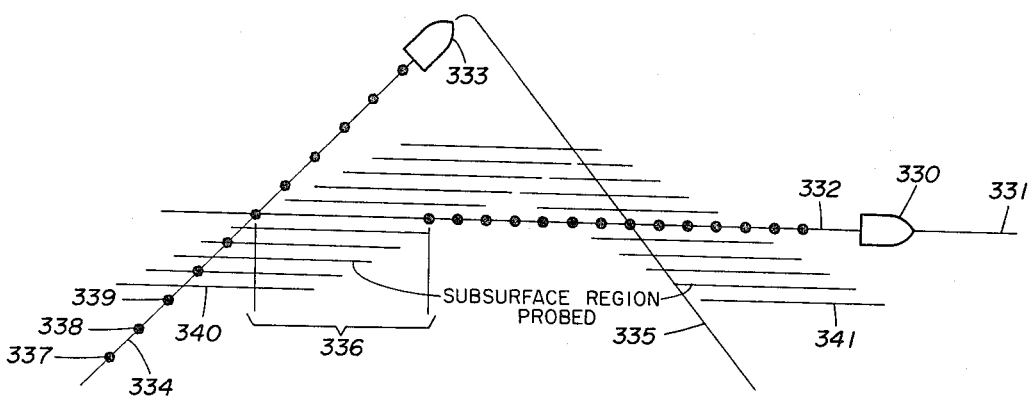
FIG. 7 illustrates a mode of operation in an offshore environment.

In FIG. 7, an operation to be carried out in a marine environment has been illustrated. In this operation, a recording boat 330 moves along a traverse 331 trailing behind it a streamer 332 of marine seismic detectors.

A shooting boat 333 follows a crooked traverse 334, 335 with the distance 336 constant. That is, the recording boat 330 and the shooting boat 333 move in concert along line 331 such that seismic impulses are generated periodically as boat 333 moves with the lateral distance 336 between the end detector on the streamer 332 and the source of impulse generation being constant. Points 337, 338 and 339 as well as additional points similarly marked along line 334 represent source points. By this means, the area within outline 340 will be probed at depth during production of seismic impulses along line 334 and the area at subsurface within the outline 341 will be probed while generating seismic impulses along like points on line 335.

Figure 8:
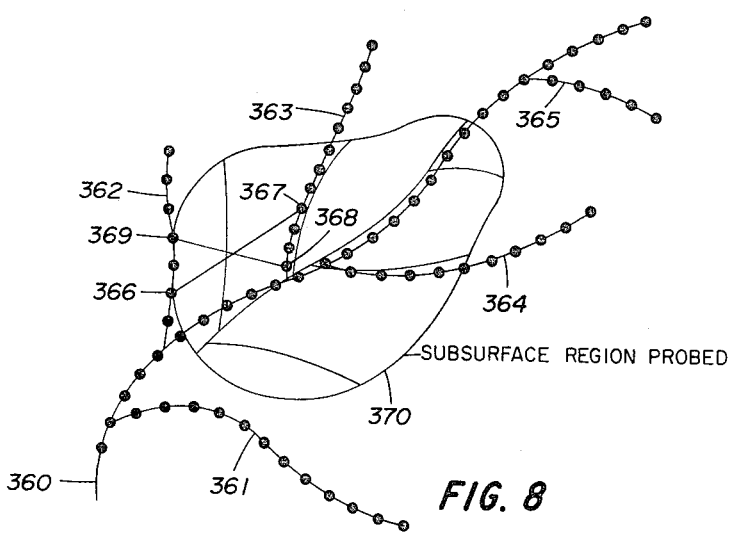
FIG. 8 illustrates a crooked traverse which is terrain controlled.

FIG. 8 illustrates a variation in which the subsurface is probed at points which are dictated by the surface conditions, such as available roads and the like. In FIG. 8, the surface contours may dictate the placement of source points and detector locations along lines branching from a main stem traverse 360. Branches 361, 362, 363, 364 and 365 diverge from the main stem 360. From an inspection, it will be apparent that there are many common depth points involved. For example, a seismic impulse generated at source location 366 and detected at location 367 will have a common depth reflecting point for a seismic impulse generated at source point 368 and detected at location 369. In general, for the pattern illustrated in FIG. 8, the subsurface within the area 370 will be probed by source points and detector locations along the branches and main stem indicated in FIG. 8.

Having described the invention in connection with certain specific embodiments thereof, it is to be understood that further modifications may now suggest themselves to those skilled in the art and it is intended to cover such modifications as fall within the scope of the appended claims.

What is claimed is:

1. In seismic exploration where seismic impulses are generated successively, one impulse at each of a plurality of locations spaced along purposefully crooked traverse and where seismic waves resulting from each said impulse are detected along said traverse, the method which comprises:

stacking all the detected signals which have a common depth point to produce stacked traces portraying multifold areal subsurface structural conditions.

2. The method of claim 1 in which selected stacked traces are summed to increase the areal significance of the resultant trace.

3. The method of claim 1 wherein said stacked traces are multifolded in differing degrees.

4. A method of gathering seismic signals which comprises:
   a. generating seismic impulses successively, one impulse at each of a plurality of source locations uniformly spaced along traverse segments which regularly cross a median line wherein said segments are of length equal to an integral multiple of the spacing between said locations,
   b. detecting seismic waves resulting from each said impulse at locations along said traverse which have common depth point relationships to the points of generation of the impulse giving rise to the detected waves, and
   c. stacking the detected signals on a common depth point basis to portray multifold areal subsurface structural conditions.

5. The method of claim 4 in which said source locations are uniformly spaced along a sawtooth traverse having straight segments of lengths equal to an integral multiple of the spacing between said locations.

6. The method of claim 4 in which seismic waves resulting from each said impulse are detected at locations along said traverse which have common depth point relationships among the locations and in which the detected signals are stacked on a common depth point basis to portray multifold areal subsurface structural conditions.

7. The method of common depth point seismic exploration which comprises:
   a. generating seismic impulses successively, one impulse at each of a plurality of locations uniformly spaced along a traverse of composed of segments which regularly cross a median line wherein said segments are of length equal to an integral multiple of the spacing between said locations,
   b. detecting seismic waves resulting from each said impulse at a non-linear set of locations along said traverse, the group of spacings along said traverse between any impulse location and the corresponding set of detector locations being invariant as a function of impulse location, and
   c. stacking the detected signals on a common depth point basis to portray multifold areal subsurface structural conditions.

8. A method of common depth point seismic exploration which comprises:
   a. generating seismic impulses successively, one impulse at each of a plurality of locations uniformly spaced along traverse segments which regularly cross a median line wherein said segments are of length equal to an integral multiple of the spacing between said locations,
   b. detecting seismic waves resulting from each said impulse at sets of detecting locations arrayed along parallel lines spaced on opposite sides of said median, and
   c. stacking the detected signals on a common depth point basis to portray multifold areal subsurface structural conditions.

* * * * *